Figure 1:
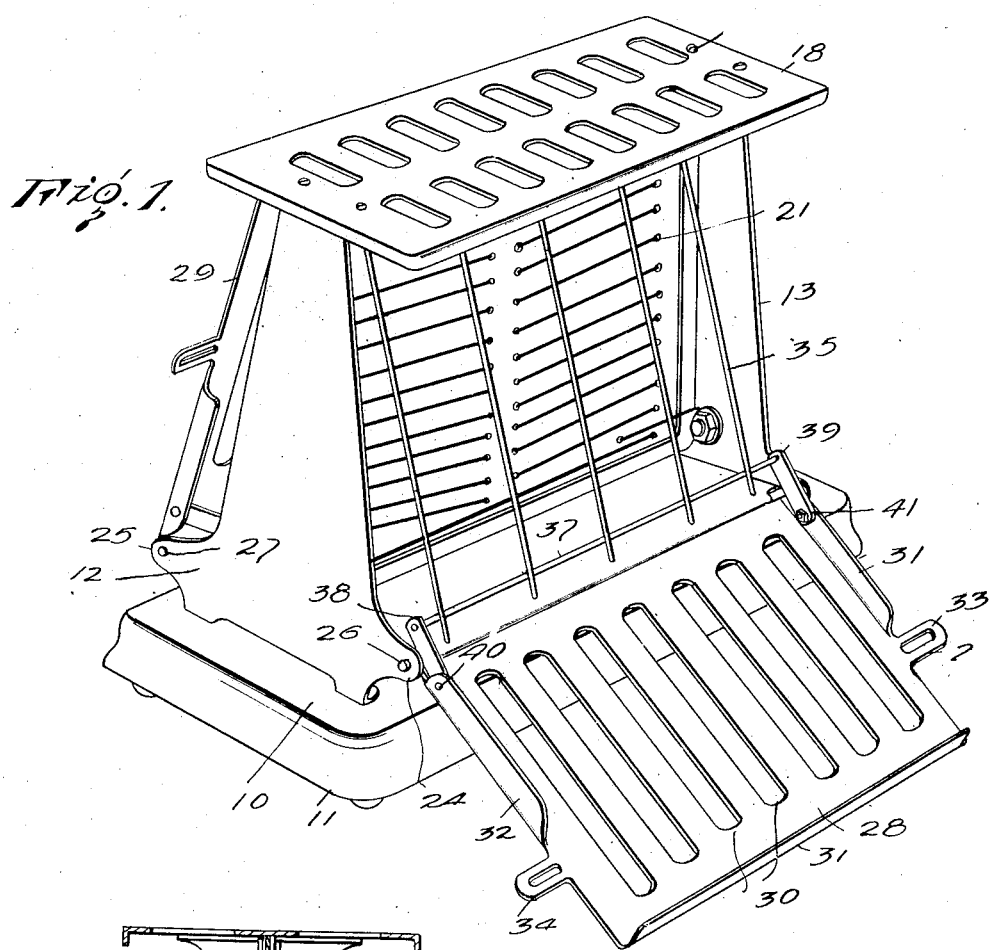

E. A. RUTENBER.
TOASTER.
APPLICATION FILED MAR. 20, 1917.

1,364,811.

Patented Jan. 4, 1921.

Edwin A. Rutenber
Inventor

By Geo. P. Kimmel
Attorney

UNITED STATES PATENT OFFICE.

EDWIN A. RUTENBER, OF MARION, INDIANA, ASSIGNOR TO RUTENBER ELECTRIC COMPANY, OF MARION, INDIANA, A CORPORATION OF INDIANA.

TOASTER.

1,364,811.   Specification of Letters Patent.   Patented Jan. 4, 1921.

Application filed March 20, 1917. Serial No. 156,051.

*To all whom it may concern:*

Be it known that I, EDWIN A. RUTENBER, a citizen of the United States, and resident of Marion, in the county of Grant and State of Indiana, have invented certain new and useful Improvements in Toasters, of which the following is a specification.

The present invention relates to the class of toasters, and has particular reference to new and useful improvements associated therewith to permit the automatic turning of the bread after one side or face thereof has been sufficiently toasted.

With this end in view I provide a stand or base and frame, and an electrical resistance member associated with the frame to provide the desired heating medium, a pair of jaws hingedly mounted on said frame having means associated therewith to provide a support for the bread during the process of toasting and at the same time having means associated therewith permitting the turning of the bread when one side thereof has been toasted.

Other improvements and novel details in the construction and novel detail of the various parts of the apparatus will be brought out more in detail in the description to follow, which, for a clear understanding of the invention, should be considered in connection with the accompanying drawing, forming a part hereof, and wherein is disclosed, for the purpose of illustration, convenient and satisfactory embodiments of the invention. It is to be noted, in this connection, that minor changes in the construction and arrangement of the parts may be made without departing from the spirit of the invention or the principle of operation of the various parts.

Figure 2:
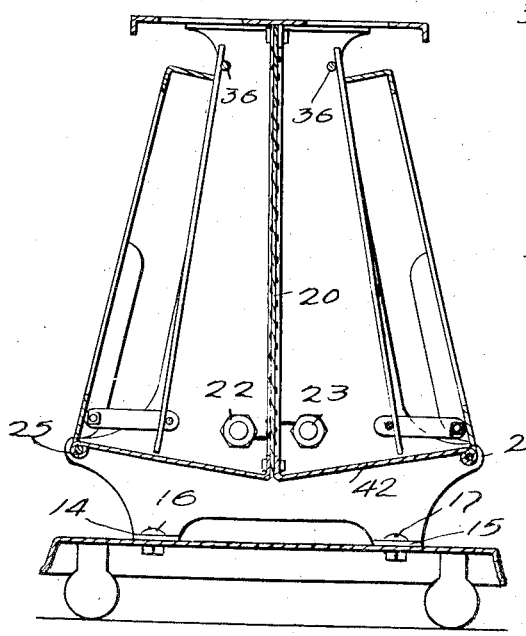

In the drawing:

Figure 1 is a perspective view of my invention showing one of the hingedly connected doors thereof in an open position, and Fig. 2 is a vertical sectional view of the same.

Corresponding and like parts are referred to in the following description and indicated in all the views of the drawing by the same reference characters.

My improved toaster comprises a sheet metal base 10 having a downwardly and outwardly extending flange 11. A pair of standards 12 and 13 are secured to said base by means of lateral extensions 14 and 15. Said extensions are provided with apertures to receive the bolts 16 and 17 providing the desired securing means to retain the standards in rigid position. A cover or top plate 18 having a plurality of transversely extending apertures therein is mounted on the said standards and retained thereon by means of the screw members 19. The heating medium of my invention comprises a vertically mounted partition of a non-conductor material preferably mica and designated 20. The said partition is provided with a plurality of apertures adapted to receive the resistance wires 21. The said wires are connected to the terminals 22 and 23 which provide means for connecting the same to the ordinary connecting plug.

Extensions 24 and 25 are provided on the lower portion of the said standards and are operated to receive transversely extending rod members 26 and 27 for a purpose which will hereinafter appear. Sheet metal doors 28 and 29 having transversely extending apertures 30 are hingedly connected to the said rods 26 and 27. The said doors are provided with laterally extending flanges 31 which are bent inwardly providing means to prevent the toast from sliding off the same when the door is in the position as shown in Fig. 1. Extensions 31 and 32 are provided on the sides of said door to prevent the toast from sliding off the ends thereof. Ears 33 and 34 are provided on the door member providing a handle or means for opening and closing the same. A rack designated 35 is hingedly connected to the frame member adjacent the upper end thereof by means of transversely extending rod members 36 which are pivotally secured to the said standards. Adjacent the lower portion of the rack is a transversely extending rod 37 having arms 38 and 39 pivotally associated therewith, the opposite ends of which are adjustably secured to the flanges or extensions 31' and 32 by means of nuts and bolts 40 and 41.

The operation is as follows: The bread to be toasted is placed on the door members after which the same are closed thus causing the ends of the toast to rest on the shelves 42, while the face presented to the heating medium is toasted and then the door members are opened outwardly, upon which movement the rack is thrown upwardly causing the side of the bread toasted to face downwardly on the door, and upon the closing of the said door the opposite side of the bread is presented to the heating medium to be toasted thus avoiding any unnecessary toasting of the bread during the toasting process.

Having thus fully described my invention, what I claim as new and desire to secure by Letters Patent, is:

1. In a device of the class described, the combination of a base, a frame member mounted on said base, an electrical heating medium mounted in said frame, a plurality of extensions formed on the frame adjacent the lower edge thereof, a rod extending longitudinally through the frame, door members hingedly connected to said rod adapted to drop outwardly from the frame, a pair of wire rack members pivotally associated with the upper edge of the frame, arm members having one end adjustably secured to said door, and the opposite end hingedly connected with the rack for a purpose specified.

2. In a device of the class described, the combination with a toasting frame, of a pair of door members hingedly connected therewith, and a pair of rack members having one end hingedly connected to the frame and the opposite end adjustably connected to the door for a purpose specified.

3. In a device of the class described, the combination with a base, of a plurality of standards mounted on said base, transversely extending rods rotatably mounted upon the lower portion of said standards, door members hingedly secured to said rods, flanges formed upon the ends of said doors, and a rack member hingedly connected at its upper end to said standards, the opposite ends of said rack member being pivotally connected with the doors for a purpose specified.

4. In a device of the class described, the combination with a base, a frame mounted on said base, and a heating medium associated with said frame, of a pair of doors hingedly secured to the lower portions of the frame, lateral extensions provided on said doors to limit the movement of the element to be toasted, a rack member having one end thereof hingedly connected to the upper portion of the frame, a rod mounted transversely of the opposite end of the rack, and a plurality of arm members having one end secured to last said rod, the opposite end being adjustably secured to the doors for a purpose specified.

5. In a toaster, the combination with a base, supporting standards, a heat producing element interposed between said standards, of shelves removably secured between said standards and adapted to support material to be toasted, a pair of doors hingedly secured to said standards, means associated with the doors and said standards permitting the edge of objects to be toasted to rest on said shelves while one face thereof is presented to the heating element, and upon the opening and closing of said doors the object to be toasted is automatically removed from the shelves and the opposite face presented for toasting.

6. In a device of the class described, the combination with a toasting frame, of a pair of door members hingedly connected therewith, and means having one end connected to the frame and the opposite end adjustably connected to the door to move outwardly from said frame as said door is opened for a purpose specified.

7. In a heating device, the combination of a heating element, means for supporting the article to be treated adjacent to the heating element comprising a basket having two sections, and means for swinging the inner section of the basket to an inclined position so that the articles will slide downward and for swinging the outer section downwardly from the inner section to a substantially horizontal position to receive the article as it slides downward.

8. In a heating device, the combination of a heating element, and means for supporting the articles to be treated adjacent to the heating element, comprising a basket including a rack movable outwardly at the bottom and an opening section for reversing the position of the article relative to the heating element.

9. In a toaster, an upright heating element, a support for said element and projected beyond opposite sides thereof, racks pivoted at their upper ends to the support for vertical swinging movement, door sections connected with the support below said racks for movement and swinging reversely to the swinging movement of said racks, and means on said sections to act upon the racks for swinging the same on the opening and closing of the sections, whereby when each section is open the rack will be moved outwardly at its lowermost end.

10. In a toaster, an upright heating element, a support for said element and projected beyond opposite sides thereof, racks pivoted at their upper ends to the support for vertical swinging movement, door sections mounted relative to the support below said racks for movement and swinging reversely to the swinging movement of said rack, means on said sections to act upon the racks for swinging the same on the opening and closing of the sections, whereby when each section is opened the rack will be moved outwardly at its lowermost end, and means between each section and rack to constitute a rest for material when carried by the section.

In testimony whereof I affix my signature hereto.

EDWIN A. RUTENBER.